United States Patent [19]
Bishop

[11] Patent Number: 5,441,438
[45] Date of Patent: Aug. 15, 1995

[54] MEASURING AND RECORDING APPARATUS USING FLUID AS THE MEASURING MEDIA FOR USE IN THE MANUFACTURE OF HYDRAULIC POWER STEERING VALVES

[75] Inventor: Arthur E. Bishop, Sydney, Australia

[73] Assignee: A.E. Bishop & Associates PTY LTD., North South Wales, Australia

[21] Appl. No.: 90,160

[22] PCT Filed: Oct. 28, 1991

[86] PCT No.: PCT/AU91/00496
§ 371 Date: Jul. 28, 1993
§ 102(e) Date: Jul. 28, 1993

[87] PCT Pub. No.: WO93/09397
PCT Pub. Date: May 13, 1993

[51] Int. Cl.6 ............................................. B24B 49/00
[52] U.S. Cl. ........................................ 451/5; 451/8; 451/252
[58] Field of Search ........... 51/105 VG, 94 R, 94 CS, 51/105 SP, 97 R, 238 R, 238 S, 238 GG, 165.71; 73/37; 451/8, 9, 10, 49, 57

[56] References Cited

U.S. PATENT DOCUMENTS

| | | | |
|---|---|---|---|
| 3,433,238 | 3/1969 | Nightingale | 73/37 |
| 3,620,239 | 11/1971 | Bright | 137/81.5 |
| 3,628,372 | 12/1971 | Honda | 73/37 |
| 3,914,754 | 10/1975 | Kirk | 340/267 R |
| 5,209,103 | 5/1993 | Dririere et al. | 73/37 |
| 5,299,388 | 4/1994 | Bishop | 51/97 R |

FOREIGN PATENT DOCUMENTS

| | | |
|---|---|---|
| 867222 | 5/1961 | United Kingdom . |
| 1099380 | 1/1968 | United Kingdom . |

*Primary Examiner*—Maurina T. Rachuba
*Attorney, Agent, or Firm*—Nikaido, Marmelstein, Murray & Oram

[57] ABSTRACT

An apparatus for measuring and recording the angular position of the edges of axially extending grooves disposed on an inside cylindrical bore surface or outside cylindrical surface of a workpiece is characterized in that the apparatus includes a shoe, pressed into intimate contact with the surface over a zone of the shoe. The zone incorporates an orifice, extending away from the zone of intimate contact to a plenum chamber, to which fluid is supplied. Relative rotation between the workpiece and the shoe is produced. A measuring device measures the degree of restriction to flow of fluid from the orifice as the edges traverse the orifice during relative rotation. An angular positional measurement device measures relative rotation, such that relative angular positions of the workpiece are recorded at each relative rotational position corresponding to a predetermined degree of restriction of the orifice as successive edges of the grooves traverse the orifice.

9 Claims, 10 Drawing Sheets

MEASURING AND RECORDING APPARATUS USING FLUID AS THE MEASURING MEDIA FOR USE IN THE MANUFACTURE OF HYDRAULIC POWER STEERING VALVES

FIELD OF THE INVENTION

This invention relates to an apparatus for use in conjunction with the manufacture of components of rotary valves such as are used in hydraulic power steering gears for vehicles. Such rotary valves include an input-shaft which incorporates in its outer periphery a plurality of blind-ended, axially extending grooves separated by lands. Journalled on the input-shaft is a sleeve having in its bore an array of axially extending blind-ended slots matching the grooves in the input-shaft, but in underlap relationship thereto, the slots of one being wider than the lands of the other so defining a set of axially extending orifices which open and close when relative rotation occurs between the input-shaft and the sleeve from a centred position, the magnitude of such rotation henceforth referred to as the valve operating angle. The edges of the input-shaft grooves are contoured so as to provide a specific orifice configuration often referred to as metering. These orifices are ported as a network such that they form sets of hydraulic Wheatstone bridges which act in parallel to communicate oil between the grooves in the input-shaft and the slots in the sleeve, and hence between an engine driven oil pump, and right-hand and left-hand hydraulic assist cylinder chambers incorporated in the steering gear.

BACKGROUND OF THE INVENTION

The general method of operation of such rotary valves is well known in the art of power steering design and so will not be described in any greater detail in this specification. A description of this operation is contained in U.S. Pat. No. 3,022,772 (Zeigler), commonly held as being the "original" patent disclosing the rotary valve concept. According to that patent, the input-shaft and sleeve are biased towards the centred position by a torsion bar spring. Thus when small input torques are applied to the steering wheel and hence the input-shaft, only a small magnitude of relative rotation occurs between the input-shaft and sleeve and, for such low valve operating angles, little power assistance is provided by the valve. For larger input torques proportionately greater valve operating angles are generated, leading to much greater levels of power assistance. The relationship between the level of power assistance generated in the valve, as a function of input torque, is known as the valve pressure characteristic. This valve pressure characteristic is therefore determined by the geometry of the changing orifice area as a function of valve operating angle.

Such rotary valves are nowadays regularly incorporated in firewall-mounted rack and pinion steering gears and, in this situation, any noises such as hiss emanating from the valve are very apparent to the driver. Hiss results from cavitation of the hydraulic oil as it flows in the orifices defined by the input-shaft metering edge contours and the adjacent edges of the sleeve slots particularly during times of high pressure operation of the valve such as during vehicle parking manoeuvres, where pressures typically as high as 8 MPa can be generated. It is well known in the art of power steering valves than an orifice is less prone to cavitation if the metering edge contour has a high aspect ratio of width to depth, thereby constraining the oil to flow as a thin sheet of constant depth all along any one metering edge contour, and that the flow of oil is divided equally amongst the aforementioned network of orifices, so further effectively increasing the aspect ratio. It is also well known that cavitation is less likely to occur if the metering edge contour, where it intersects the outside diameter of the input-shaft, is nearly tangential thereto, hence constituting a shallow chamfer of no more than about 1 in 12 slope. Typically, during high pressure operation of the rotary valve, one edge of each sleeve slot is angularly displaced about one half of a degree from the point of intersection of this chamfer with the input-shaft outside diameter, and the radial depth of the orifice so formed is about 0.012 mm.

As the input-shaft and sleeve are angularly displaced towards the centred position, cavitation is less likely to occur and additional chamfers of steeper slope are sometimes used further down the metering edge contour in order to generate the required pressure characteristic in the zone of valve operation associated with vehicle cornering.

Several manufacturers achieve the desired accuracy in the metering edge contour by grinding these chamfers in special machines in which the input-shaft is supported on centres previously used for cylindrically finish grinding its outside diameter. Such chamfer grinding machines incorporate a large diameter cylindrical grinding wheel, of a width equal to the axial extent of the metering edge contours, which is successively traversed across the edge of each input-shaft groove at varying radial heights with respect to the input-shaft axis.

Other manufacturers adapt, for this purpose, cam grinding machines similar to those used for example in the manufacture of camshafts for automobile engines, thread cutting taps, and router cutters, wherein the workpiece is supported on centres and rotated continuously while being cyclically moved towards and away from a grinding wheel under the action of a master cam. The required amount of stock is progressively removed by infeeding of the grinding wheel during many revolutions of the workpiece. As in the case of chamfer grinding machines, a large diameter grinding wheel is used, which makes it impossible to grind that part of the metering edge contour towards the centreline of the groove where increasing depth would cause the grinding wheel to interfere with the opposite edge of the same groove. This steeply sloping and relatively deep portion of the input-shaft metering edge contour will henceforth be referred to as the "inner" metering edge contour and its geometry generally affects the on-centre region of the valve pressure characteristic. This portion is generally manufactured by means other than the chamfer or cam grinding machines just described which, for reasons stated, are only capable of grinding the "outer" metering edge contour. This previously described gently sloping wedge shaped portion of the metering edge contour determines the valve pressure characteristic at medium and high operating pressures, as well as determining the valve noise characteristic.

The total valve operating angle from the centred position to the region of maximum operating pressure associated with vehicle parking is typically about 3½ degrees, of which the inner and outer metering edge contours each control about one half. The junction between the inner and outer metering edge contours usually occurs in the intermediate range of valve operation associated with vehicle cornering, where it is important to have a progressive or approximately linear valve pressure characteristic without any discontinuities, thereby maximising the driver's control of the vehicle in this important mode of operation. To achieve this linear relationship, the outer metering edge contour, starting from the flat chamfer needed for hiss suppression, is required to have a spiral geometry of increasing curvature, which can provide the necessary relationship between orifice area and valve operating angle. For the practical manufacturing reasons described above, it is not possible to continue this spiral geometry on the inner portion of the metering edge contour, however the same type of orifice area versus valve operating angle relationship can be achieved by using metering edge contours of varying cross-sectional shape along their length, which can be manufactured by means other than grinding. This is acceptable as there is no longer the need for achieving uniform thin sheet flow as in the case of the outer metering edge contours due to the lower operating pressures associated with the inner metering edge contours. For example the required three dimensional metering edge geometries can be approximated by using milling or hobbing processes to form the input-shaft grooves. A better solution, without compromise, is available using the roll-imprinting process described in U.S. Pat. No. 4,651,551 (Bishop) which allows limitless three dimensional featuring on the sides of the grooves.

SUMMARY OF THE INVENTION

Nevertheless all of the above milling, hobbing or roll-imprinting operations must be carried out prior to hardening of the input-shaft and, due to metallurgical distortion, will inevitably have some eccentricity with respect to the subsequently cylindrically ground outside diameter. Fortunately it is no longer important for the inner metering edge contours to equally share the flow of oil around the network of orifices as applies for the outer contours, and it suffices that the correct mean relationship between orifice area and operating angle is achieved. However in order to have a smooth junction between the inner and outer contours and hence a continuous linear pressure characteristic without discontinuities, it is highly desirable to gauge the previously processed inner metering edge contours prior to grinding the outer metering edge contours. Ideally this gauging is carried out in the grinding machine used to grind the outer metering edge contours but immediately prior to the actual grinding process. The inner metering edge contours are initially gauged so that the angular position of each edge on the clockwise and anticlockwise sides of each groove can be recorded and an arithmetic mean angle computed. This computed mean angle is then compared to the datum angle of symmetry of the machine, and a small correction made to the angular position of the input-shaft relative to this datum. The mean position of the outer metering edge contours then ground will be precisely symmetrical with the mean position of the inner metering edge contours, thereby achieving the optimum junction therebetween and a smooth linear progression in the valve pressure characteristic. A practical means of facilitating this in-process gauging and correction procedure is a key object of the present invention.

Alternatively, but less ideally, this gauging can be carried out prior to placing the input-shaft into the grinding machine and the gauging used to establish a physical datum on the component (or on a fixture attached to the component) so that its correct angular orientation is ensured when it is eventually placed in the grinding machine.

A further object of the present invention is to provide a means of post-process gauging, whilst the input-shaft is still in the machine, the precise angular position of the now-ground outer metering edge contours. The accuracy of this angular position determines not only the magnitude of valve hiss, but also the precision of the valve pressure characteristic, particularly the magnitude of the input torque required to generate maximum parking pressure in the steering gear. As explained earlier, such maximum parking pressures are typically developed at a point on the outer metering edge contour which has a depth of approximately 0.012 mm. The shallow slope of this chamfered portion of the metering edge contour, immediately adjacent to its intersection with the input-shaft outside diameter, means that steering gear parking torque is very sensitive to small variations in the depth of the metering edge contour in this region. A means of measurement of the angular position of the outer metering edge contours, ideally at a point on the metering edge contour of approximately 0.012 mm depth corresponding to the point of maximum parking pressure, will enable accurate determination of parking torques for a given input-shaft whilst the input-shaft is still in the grinding machine. Thus in-process corrections can be made, for example, to allow for grinding wheel wear.

A further object of the present invention is to provide a means of measuring the outside diameter of the input-shaft whilst still in the grinding machine. Knowledge of this parameter is necessary in order to make the precise in-process corrections referred to. Also the input-shaft outside diameter must be accurately controlled to a typical 0.008 mm tolerance in production to minimize hydraulic leakage, yet provide minimum operating friction at the main journal interface between input-shaft and sleeve components.

Ideally all three of these gauging tasks are provided by a single apparatus which can be integrated within the machine used to grind the outer metering edge contours. It is preferred that the first of the above tasks, that is gauging and correcting the optimum orientation of the ground outer metering edge contours with respect to the pre-processed inner metering edge contours, is performed on every component processed. The other two tasks, that is post-process gauging of the ground outer metering edge contours and the input-shaft outside diameter, may be carried out periodically when necessary in order to maintain the accuracy being achieved by the operation.

Mechanical gauging of the small scale features of the metering edge contours is extremely difficult to achieve accurately, exacerbated by the aforementioned preferred spiral, or curvilinear, geometry of such contours. Moreover any such mechanical gauging method will inherently be time consuming and therefore impractical, from an economic viewpoint, for integration within the metering edge contour grinding process. In the present invention, a fluid is therefore used to gauge, hydraulically or pneumatically, the angular positions of the metering edge contours. This fluid is supplied to an orifice incorporated in a concave arcuate shoe urged into contact with the outside diameter of the input-shaft, the radius of the shoe being slightly larger than the radius of the input-shaft and therefore ensuring intimate contact between the shoe and the input-shaft in the zone of the orifice. A fluid circuit measures the effective restriction of the orifice to the flow of fluid, as the input-shaft is rotated under the shoe and, hence via calculation, the angular position of the edges of the axially extending grooves disposed on the outside diameter of the input-shaft. Such a technique is not only highly accurate and fast, but also has the advantage that it simulates (or models) the eventual in-vehicle operation of the power steering valve where fluid (in most cases automatic transmission hydraulic fluid) flows through the orifices in the power steering valve under the action of a power steering pump.

As described earlier, the edges of the axially extending, blind-ended slots in the bore of the sleeve interact with the input-shaft metering edge contours to form the orifices within the rotary valve. It therefore follows that the accurate angular disposition of these sleeve slots is also very important in determining the magnitude of valve hiss and the precision of the overall valve pressure characteristic. The slots in rotary valve sleeves are normally manufactured by broaching, end-milling, cold forming or slotting methods and all these processes tend to leave a small burr protruding radially into the sleeve bore, which is subsequently removed when this bore is accurately sized by grinding and/or honing processes. It is therefore not possible to employ the present invention for in-process gauging of the angular position of sleeve slots, simply because this burr prevents adequate fluid sealing adjacent to the zone of intimate contact of the shoe. However the present invention represents a viable configuration for the post-process measurement of such slots, that is as a means of inspection or certification of the component. The finished sleeve bore is diametrally extremely accurate and ideally suited to receiving a shoe similar to that described above in reference to measuring the input-shaft. In the case of the sleeve, however, the shoe is required to have a convex arcuate surface, rather than concave, and have a radius slightly smaller than the radius of the sleeve bore.

The present invention therefore consists in an apparatus for measuring and recording the angular position of the edges of axially extending grooves disposed on an inside cylindrical bore surface or outside cylindrical surface of a workpiece characterized in that said apparatus includes a shoe, means to press said shoe into intimate contact with said surface over a small zone of said shoe, said zone incorporating an orifice, said orifice extending away from said zone of intimate contact to a plenum chamber, means to supply fluid to said plenum chamber, means to cause relative rotation between said workpiece and said shoe, means to measure the degree of restriction to flow of said fluid from said orifice as said edges traverse said orifice during said relative rotation, angular positional measurement means to measure said relative rotation, whereby said relative angular position of said workpiece is recorded at each relative rotational position corresponding to a predetermined degree of restriction of said orifice as successive edges of said grooves traverse said orifice.

BRIEF DESCRIPTION OF THE DRAWINGS

In order that the invention may be better understood, a preferred form thereof is now described, by way of example, with reference to the accompanying drawings, in which.

DESCRIPTION OF THE PREFERRED EMBODIMENTS

Figure 1:
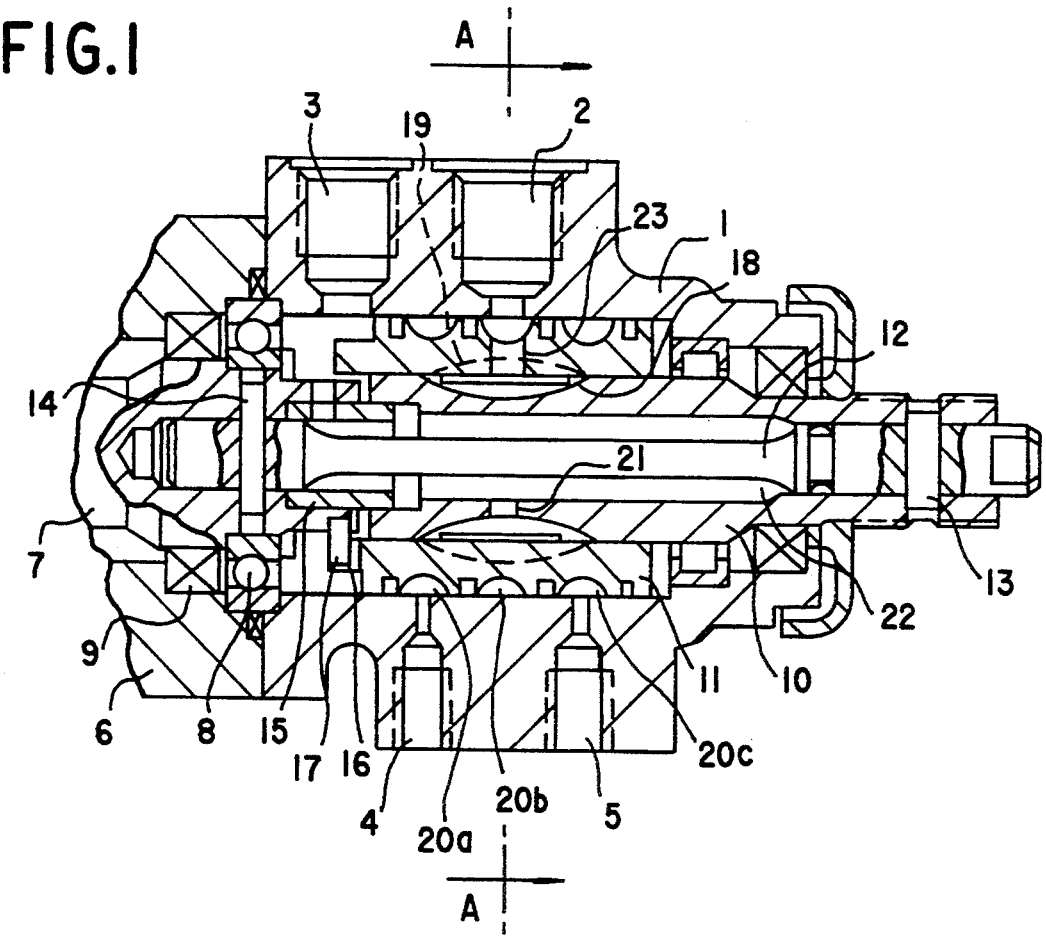
FIG. 1 is a cross-sectional view of a rotary valve installed in a valve housing of a power steering gear.

Referring to FIG. 1, valve housing 1 is provided with pump inlet and return connections 2 and 3 respectively and right and left hand cylinder connections 4 and 5. Steering gear housing 6, to which valve housing 1 is attached, contains the mechanical steering elements, for example, pinion 7, journalled by ball race 8 and provided with seal 9. The three main valve elements comprise input-shaft 10, sleeve 11 journalled thereon, and torsion bar 12. Torsion bar 12 is secured by pin 13 to input-shaft 10 at one end, similarly by pin 14 to pinion 7 at the other. It also provides a journal for input-shaft 10 by way of bush 15. Sleeve 11 has an annular extension having therein slot 16 engaging pin 17 extending radially from pinion 7.

Figure 2:
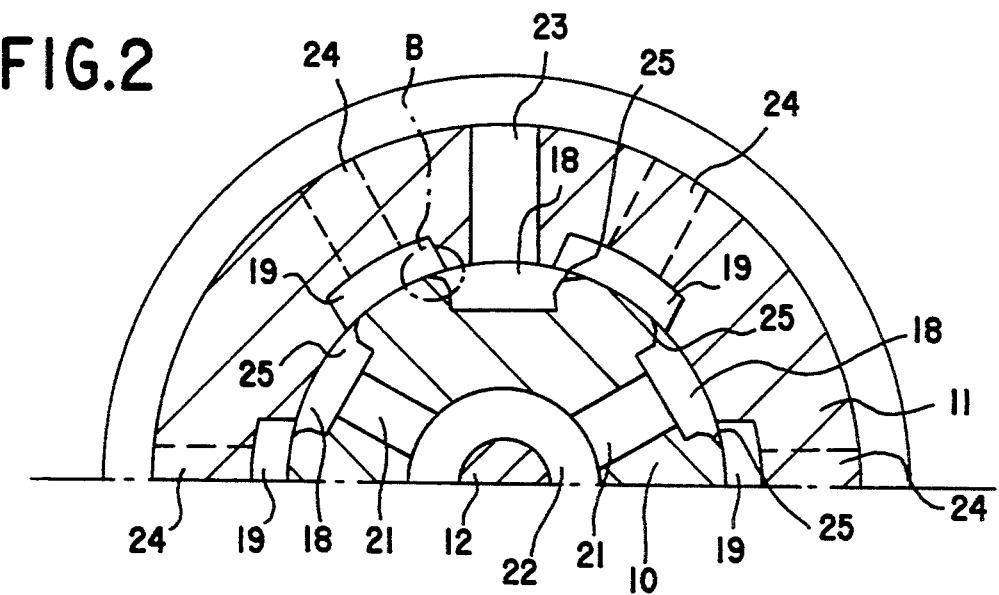
FIG. 2 is a cross-sectional view on plane AA in FIG. 1 of the input-shaft and surrounding sleeve components of the rotary valve.

Referring now also to FIG. 2, input-shaft 10 incorporates on its outside periphery six axially extending, blind-ended grooves 18. These grooves are disposed in an underlap relationship to six corresponding axially extending, blind-ended slots 19 on the mating inside diameter of sleeve 11. Sleeve 11 is also provided on its outside periphery with a series of axially spaced circumferential grooves 20a, 20b, 20c separated by seals. Radial holes 21 in input-shaft 10 connect alternate grooves 18 to centre hole 22 in input-shaft 10 whence return oil can flow to pump return connection 3.

Radial holes 23 in sleeve 11 connect the remaining alternate grooves 18 of input-shaft 10 to the centre circumferential groove 20b, and so to inlet port 2. Alternate sleeve slots 19 are connected by radial holes 24 to corresponding circumferential grooves 20a and 20c and so to cylinder connections 4 and 5.

In FIG. 2 it will be seen that, in the centred position of the valve illustrated, the underlapping of the six grooves 18 and six slots 19 form twelve axially extending orifices 25, whose area varies as a function of valve operating angle, that is as a function of the relative rotation of input-shaft 10 and sleeve 11 from their centred position.

Figure 3:
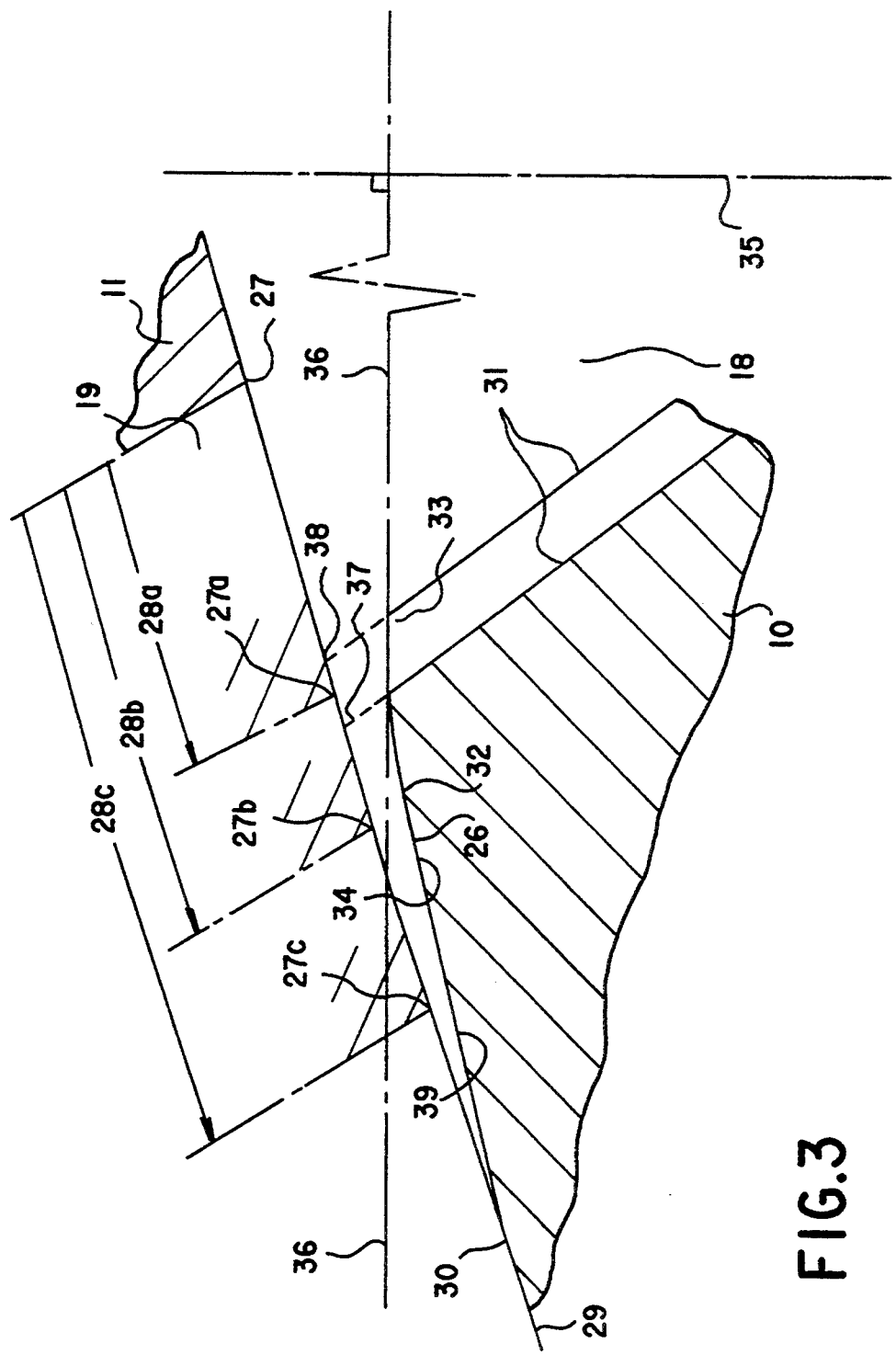
FIG. 3 is a greatly enlarged view of region B in FIG. 2 showing details of the orifice formed between the input-shaft metering edge contour and the adjacent sleeve slot edge.

FIG. 3 is a greatly enlarged view of region B in FIG. 2 showing details of one such orifice 25 formed between the metering edge contour 26 of one groove 18 of input-shaft 10, and the interacting adjacent edge 27 of one slot 19 of sleeve 11. In the rotary valve described in this embodiment, all twelve metering edge contours 26 are of identical geometry, with alternate metering edge contours a mirror image of that shown. Metering edge contour 26 is shown here in its orientation with respect to edge 27 when the valve is in the centred position. As relative rotation occurs between input-shaft 10 and sleeve 11, edge 27 moves successively to positions 27a, 27b and 27c, these rotations from the centred position corresponding to valve operating angles 28a, 28b and 28c respectively. Metering edge contour 26, termed the outer metering edge contour, extends from the junction with the outside diameter 29 of input-shaft 10 as at point 30, to the junction with the inner metering edge contour 31 as at points 32 and 33.

The portion of outer metering edge contour 26 between points 30 and 34 is essentially a flat chamfer, after which it becomes increasingly convex as it approaches point 32. Here it has become perpendicular to centreline 35 of groove 18, and hence can no longer be further ground by a large diameter grinding wheel whose periphery, at the scale shown here, appears as near-straight line 36. Outer metering edge contour 26 has a spiral geometry between points 34 and 32, assisting to provide the linear pressure characteristic required of such valves.

Inner metering edge 31 is shown as two lines representing the curved nature of the sides of groove 18, which may be so formed by milling, hobbing or roll-imprinting methods well known in the art. Prior to grinding the outer metering edge contour 26, inner metering edge contour 31 would have extended to intersect the cylindrical surface of the input-shaft outside diameter 29 along an axially extending curved line on this surface between points 37 and 38.

It can be appreciated that the pressure rise developed by orifice 25 (in FIG. 2), up to valve operating angle 28a where (at point 27a) sleeve slot edge 27 makes it closest approach to point 32, is controlled by the form of the inner metering edge contour 31. On the other hand, the pressure rise developed by orifice 25 through the range of valve operating angles 28a-28c is controlled exclusively by the form of the outer metering edge contour 26. At point 39 the depth of the outer metering edge contour 26, that is distance 27c-39, is typically 0.012 mm and generates sufficient pressure for vehicle parking.

Figure 4:
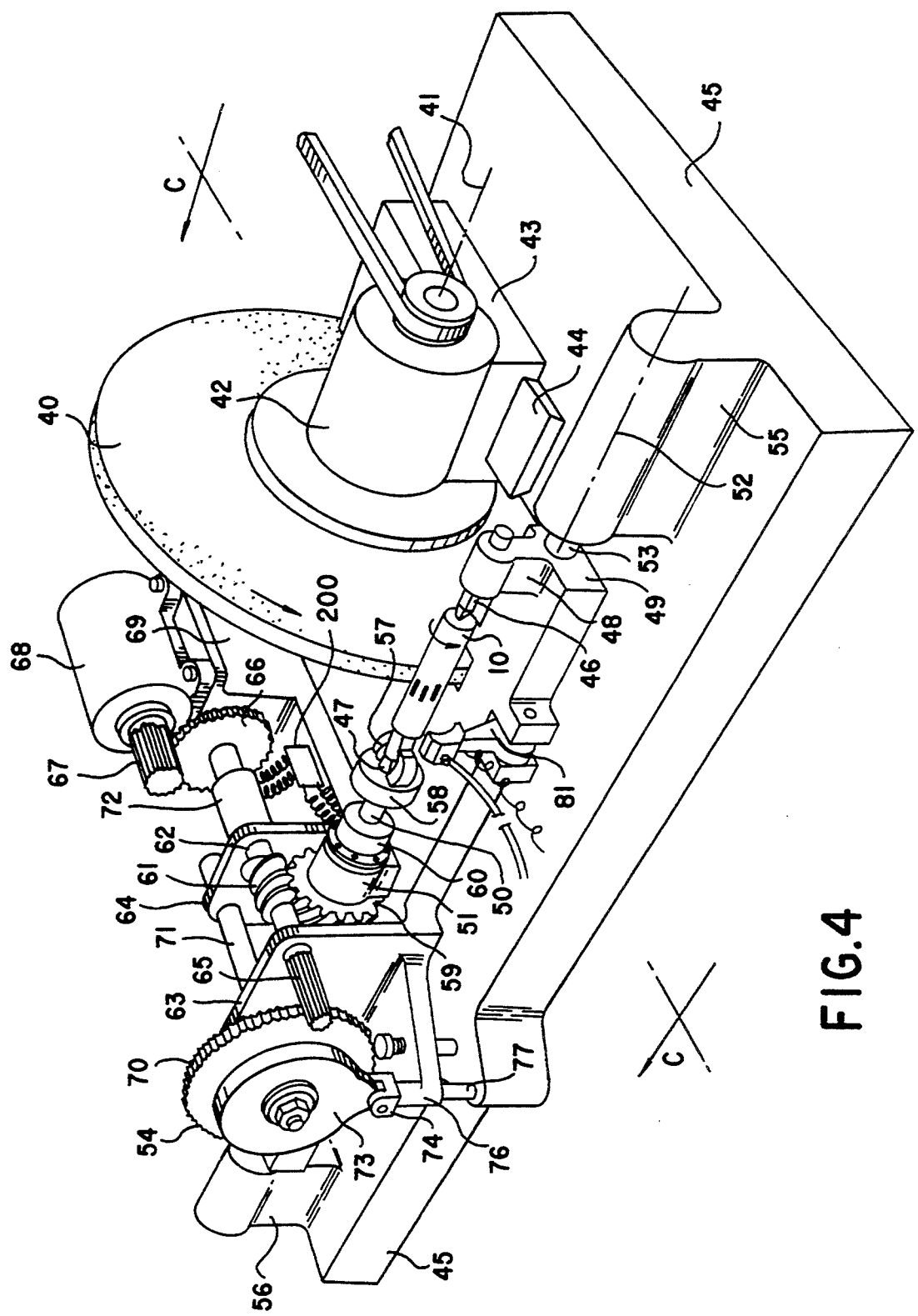
FIG. 4 is a perspective view of a metering edge contour grinding machine incorporating the gauging device, however with the gauging device retracted from the input-shaft for reasons of clarity.

FIG. 4 shows schematically the principal features of a metering edge contour grinding machine in which large diameter grinding wheel 40 is mounted on a spindle having an axis 41 housed in journal 42 carried on slide 43 operable in slideway 44 which forms part of machine base 45. Input-shaft 10 is supported for rotation on dead centre 46 and live centre 47. Dead centre 46 is mounted via pedestal 48 to rocking platform 49. Live centre 47 protrudes from main work spindle 50, journalled for rotation in pedestal 51, also mounted to rocking platform 49. Rocking platform 49 is journalled for oscillation about axis 52 via pivots 53 and 54, respectively carried in pedestals 55 and 56 extending from machine base 45. Input-shaft 10 incorporates two flats 57 machined thereon which are gripped by the two floating jaws of chuck 58, surrounding live centre 47 and also driven by main work spindle 50. The manner of opening and closing the jaws of chuck 58 is conventional.

Main work spindle 50 is driven by worm wheel 59, its resulting rotational angle being accurately measured by hollow shaft angular encoder 60 mounted to pedestal 51. Worm 61 integral with worm shaft 62, engages worm wheel 59 in a slack free manner and is journalled for rotation and axial sliding in journal plates 63 and 64 extending vertically from rocking platform 49. Worm shaft 62 extends forwardly of journal plate 63 (in FIG. 4) and has pinion teeth 65 cut thereon, and extends rearwardly of journal plate 64 to support gear 66 which engages pinion 67 of motor 68. Motor 68 is mounted on bracket 69 which forms an integral part of rocking platform 49 and therefore oscillates therewith about pivots 53 and 54. Gear 70 is carried on shaft 71 and meshes with pinion teeth 65 of worm shaft 62. Shaft 71 is also journalled for rotation in journal plates 63 and 64, but restrained from axial sliding therein.

Stepper motor 72, mounted to the rear of journal plate 64, incorporates a hollow lead screw and thereby serves to axially slide worm shaft 62 on command from a suitable power source driven by a computer. During such axial sliding of worm shaft 62, the elongated nature of pinion teeth 65 serves to maintain mesh with axially fixed gear 70, likewise the elongated nature of pinion 67 of motor 68 serves to maintain mesh with gear 66. This axial sliding of worm shaft 62 is therefore capable of adding or subtracting small incremental angular rotations to (or from) the overall angular rotation of main work spindle 50.

Figure 5:
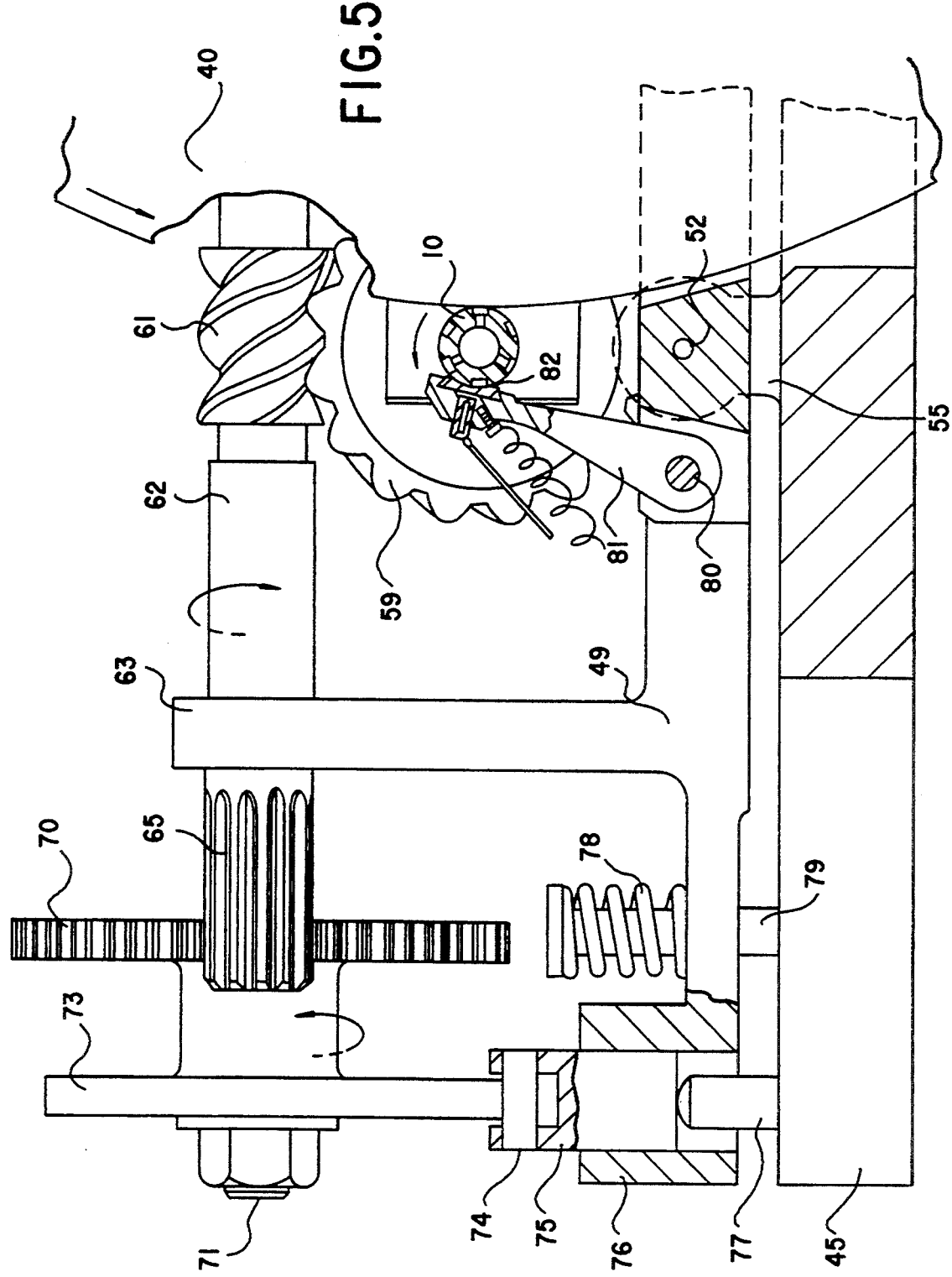
FIG. 5 is a cross-sectional view on plane CC in FIG. 4 showing the gauging device in contact with the input shaft.

The ratios of pinion teeth 65, gear 70, worm 61 and worm wheel 59 are such that when grinding a six groove input-shaft, shaft 71 makes six revolutions for one revolution of main work spindle 50. Referring now also to FIG. 5, cam 73 is mounted on shaft 71 and contacts follower pin 74 journalled in slider 75, slider 75 in turn housed within boss 76 extending from rocking platform 49. At its lower end slider 75 rests on pin 77 secured to machine base 45. Spring 78, loaded against rocking platform 49 by headed pin 79, keeps cam 73 in contact with follower pin 74 and slider 75 in contact with pin 77, and assures a positive, slack-free oscillation of rocking platform 49 in accordance with the lobed profile of cam 73. This oscillation of rocking platform 49 serves to sequentially infeed and outfeed input-shaft 10 from grinding wheel 40, thereby grinding outer metering edge contours 26. The action of stepper motor 72, and hence the axial sliding component of worm shaft 62, is thereby capable of affecting a phase adjustment of the rotation of main work spindle 50 in relation to the rotational position of cam 73.

Now rocking platform 49 incorporates journals for pin 80, the latter which provides a hinge for gauging device 81. In FIG. 4 gauging device 81 is shown retracted from contact with the outside diameter 29 of input-shaft 10 for reasons of clarity. In FIG. 5 gauging device 81 is seen swung into position where arcuate shoe 82 contacts the cylindrical outside diameter 29 of input-shaft 10, enabling measurement of the angular position of the edges of the axially extending grooves 18 in a manner now to be described.

Figure 6:
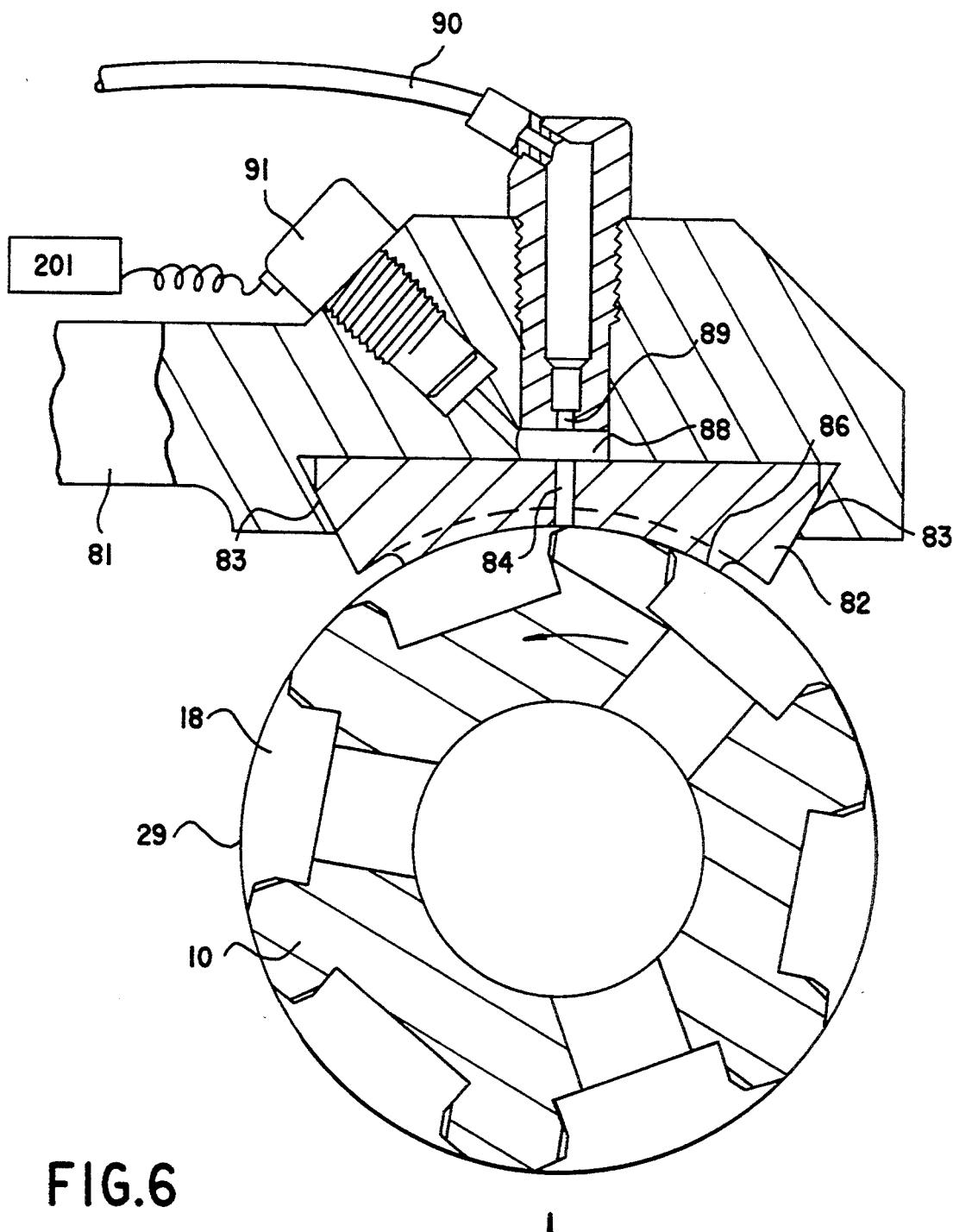
FIG. 6 is a cross-sectional view on plane CC in FIG. 4 showing details of the gauging device where the fluid employed for gauging is a gas.
Figure 7:
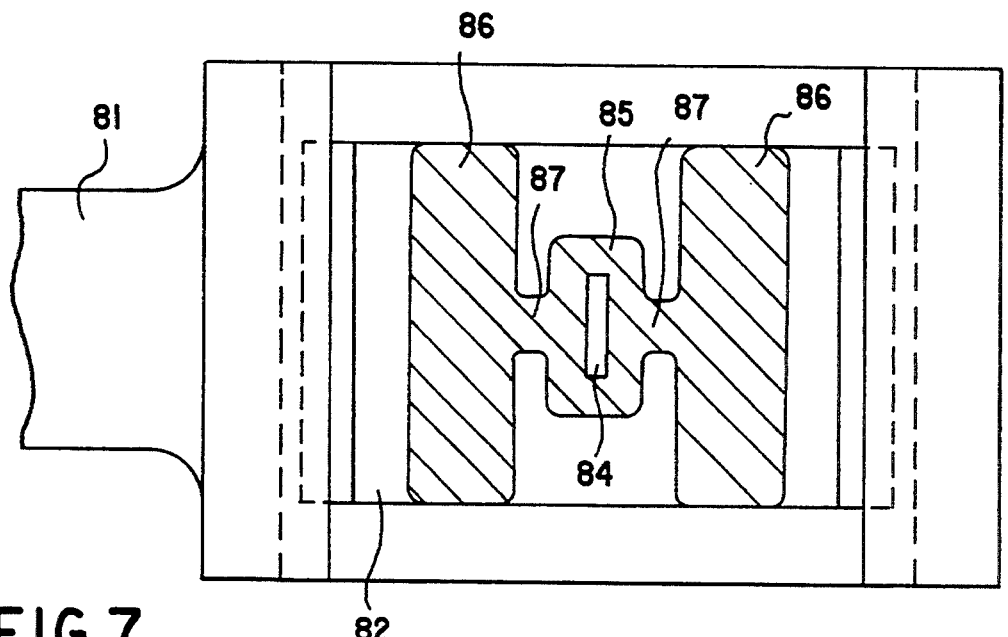
FIG. 7 is a view in direction D in FIG. 6, with the input-shaft removed, showing details of the shoe of the gauging device.

FIG. 6 and FIG. 7 show an enlarged view of gauging device 81 which supports arcuate shoe 82 via dovetail 83. Arcuate shoe 82 incorporates an orifice in the form of axially aligned slit 84, located in the centre of intimate contact zone 85, which is in turn linked to guide zones 86 by small bridge zones 87. The entire surface 85, 86 and 87 (shaded in FIG. 7) is of the same radial curvature, but of a radius slightly larger than the largest diameter input-shaft to be ground. The purpose of bridge zones 87 is to ensure that the sharp edges of inner metering edge contours 31 (prior to grinding outer metering contour 26) do not catch on the slightly raised corner of intimate contact zone 85. Slit 84 communicates with plenum chamber 88 supplied with air through calibrated orifice 89 and flexible pipe 90 from a convenient regulated and filtered constant pressure source. The pressure in plenum chamber 88 is measured by pressure transducer 91.

Figure 8:
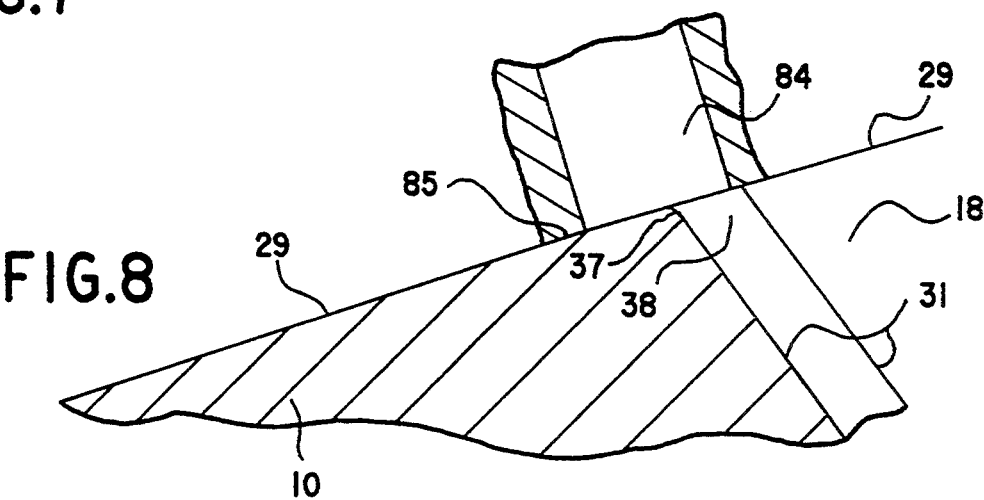
FIG. 8 is a cross-sectional view on plane CC in FIG. 4, but at grossly enlarged scale, showing details of the shoe of the gauging device contacting the outside diameter of the input-shaft prior to grinding the metering edge contours, in order to measure the angular position of the pre-milled, hobbed or roll-imprinted groove edges.

FIG. 8 shows an enlarged view of intimate contact zone 85 of shoe 82 and slit 84 in the position used when gauging the angular position of inner metering edge contours 31, prior to grinding outer metering edge contours 26. Slit 84 is normally arranged in the centre portion of axially extending groove 18 and, since inner metering edge contour 31 will frequently be concave if produced by methods such as hobbing (as shown), slit 84 traverses the widest section of the groove. If metering edge contour 31 is produced by milling or roll-imprinting methods, it may be concave or straight sided and, in the latter case, the two lines indicated as contour 31 will superimpose. As slit 84 traverses edge 37 of inner metering edge contour 31 in the position shown corresponding to the point of near close-off, a large restriction to air flow is generated and the pressure in plenum chamber 88, measured by pressure transducer 91, sharply rises. This pressure rise is caused by the reduction in flow through, and hence the pressure drop across, calibrated orifice 89. Accuracy of gauging as slit 84 traverses edge 37 is maximized as the effective area of this slit 84, i.e. the area through which air flows, at the instant of gauging is of the same order as that of calibrated orifice 89.

Figure 9:
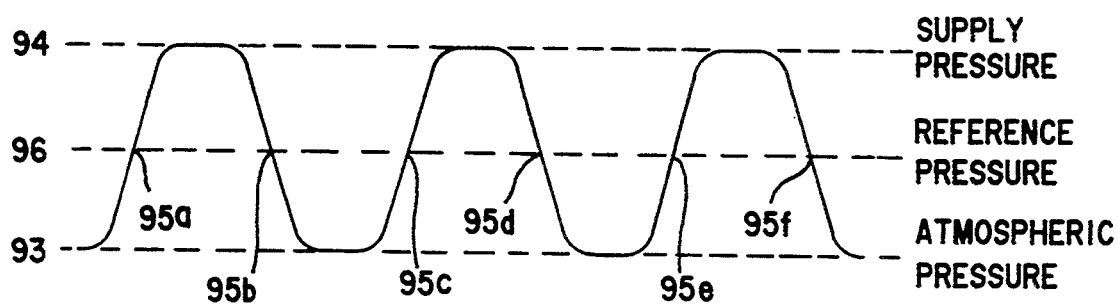
FIG. 9 is a typical plot of the air pressure recorded at the plenum chamber of the gauging device shown in FIG. 6.

FIG. 9 shows a plot of the pressure trace of recorder 201, as measured by pressure transducer 91, with the pressures shown on the vertical ordinate and cyclically increasing and decreasing through the range between atmospheric pressure 93 and supply or relief pressure 94. The horizontal abscissa on this plot corresponds to the angular rotational position of input-shaft 10 as measured by angular encoder 60. Successive positions 95a–f represent the points where sufficient restriction is generated at slit 84 to generate reference pressure 96, as slit 84 traverses the twelve successive edges 37 of inner metering edge contours 31. The corresponding angular positions, as measured by angular encoder 60, are fed into a computer 200 in order to calculate the mean or average position of all clockwise and anticlockwise edges around the input-shaft. Upon completion of this computation, a phase correction is made to the angular position of input-shaft 10, via stepper motor 72 as earlier described, prior to grinding outer metering edge contours 26. Using this gauging and correction procedure, the eventual array of outer metering edge contours 26 is symmetrically, and therefore optimally, angularly disposed with respect to the array of pre-machined inner metering edge contours 31.

Figure 10:
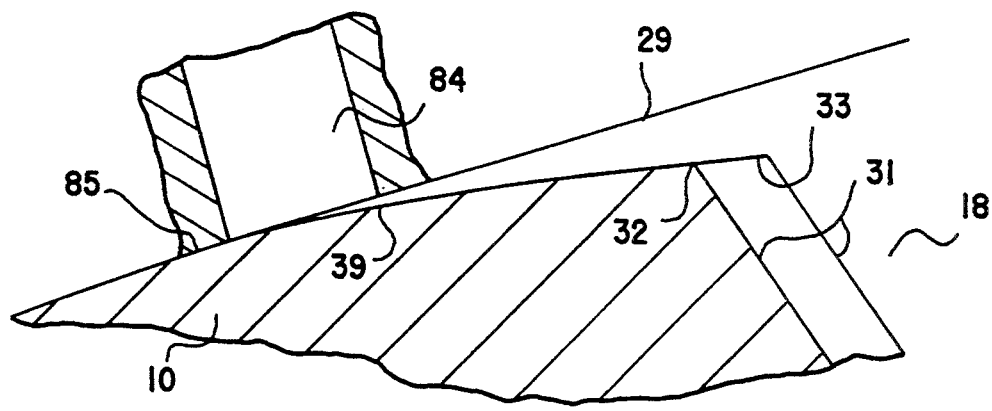
FIG. 10 is a cross-sectional view on plane CC in FIG. 4, but at grossly enlarged scale, showing details of the shoe of the gauging device contacting the outside diameter of the input-shaft after grinding the metering edge contours, in order to measure the angular position of these contours.

FIG. 10 shows an enlarged view of intimate contact zone 85 of shoe 82 and slit 84 in the position used when gauging the angular position of the outer metering edge contours 26, after grinding. In such a finish gauging procedure, it may be sufficient to gauge a single contour or, alternatively, all twelve contours may be gauged. Intimate contact zone 85 is seen engaging the outside diameter 29 of (now) finished ground input-shaft 10 adjacent to point 39 on outer metering edge contour 26, point 39 having a depth of approximately 0.012 mm and corresponding to that point on the contour determining maximum parking efforts of the steering gear (as earlier described). By gauging the angular position of point 39 on the twelve outer metering edge contours 26 around the outside periphery of input-shaft 10, it is therefore possible to measure (in production) the parking effort generated by the rotary valve, prior to assembly into the steering gear and final functional testing. This method therefore constitutes a viable method of "in-process" gauging the input-shaft components, consistent with the aims of "Total Quality Control" management methods.

Figure 11:
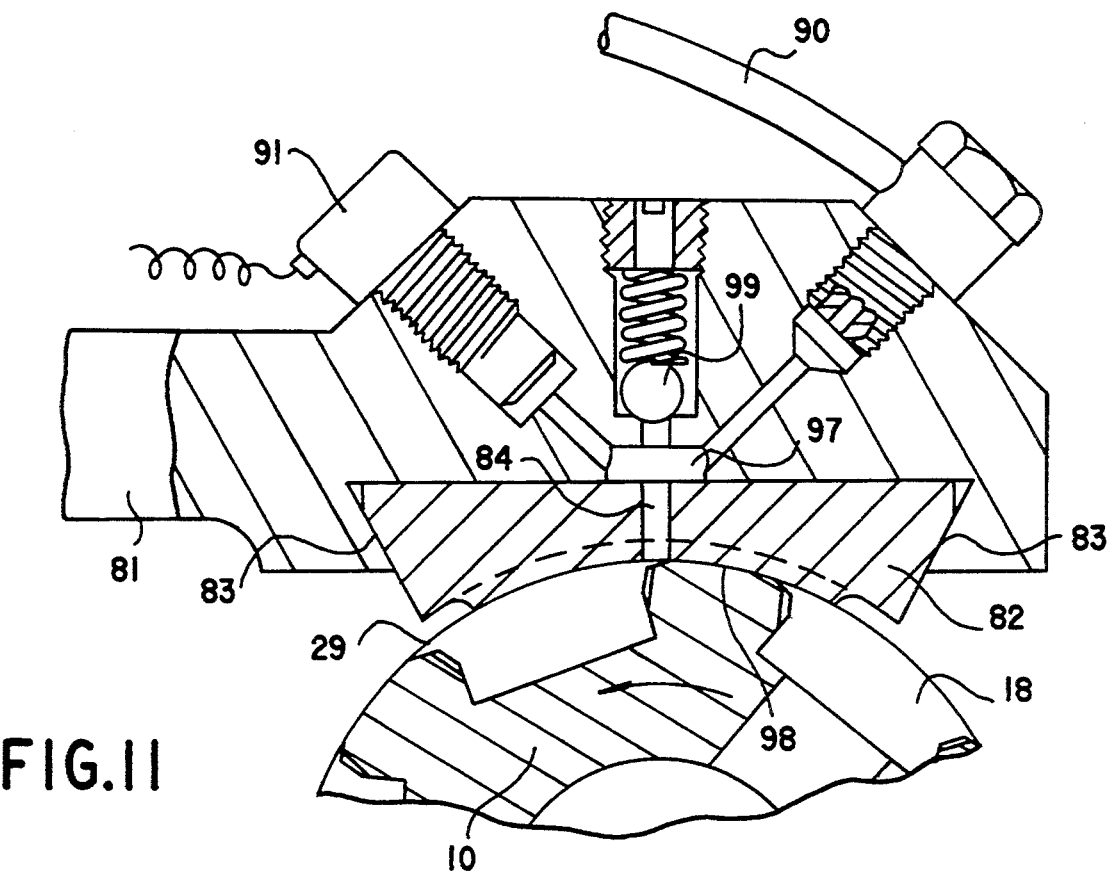
FIG. 11 is a cross-sectional view on plane CC in FIG. 4 showing details of the gauging device where the fluid employed for gauging is a liquid.
Figure 12:
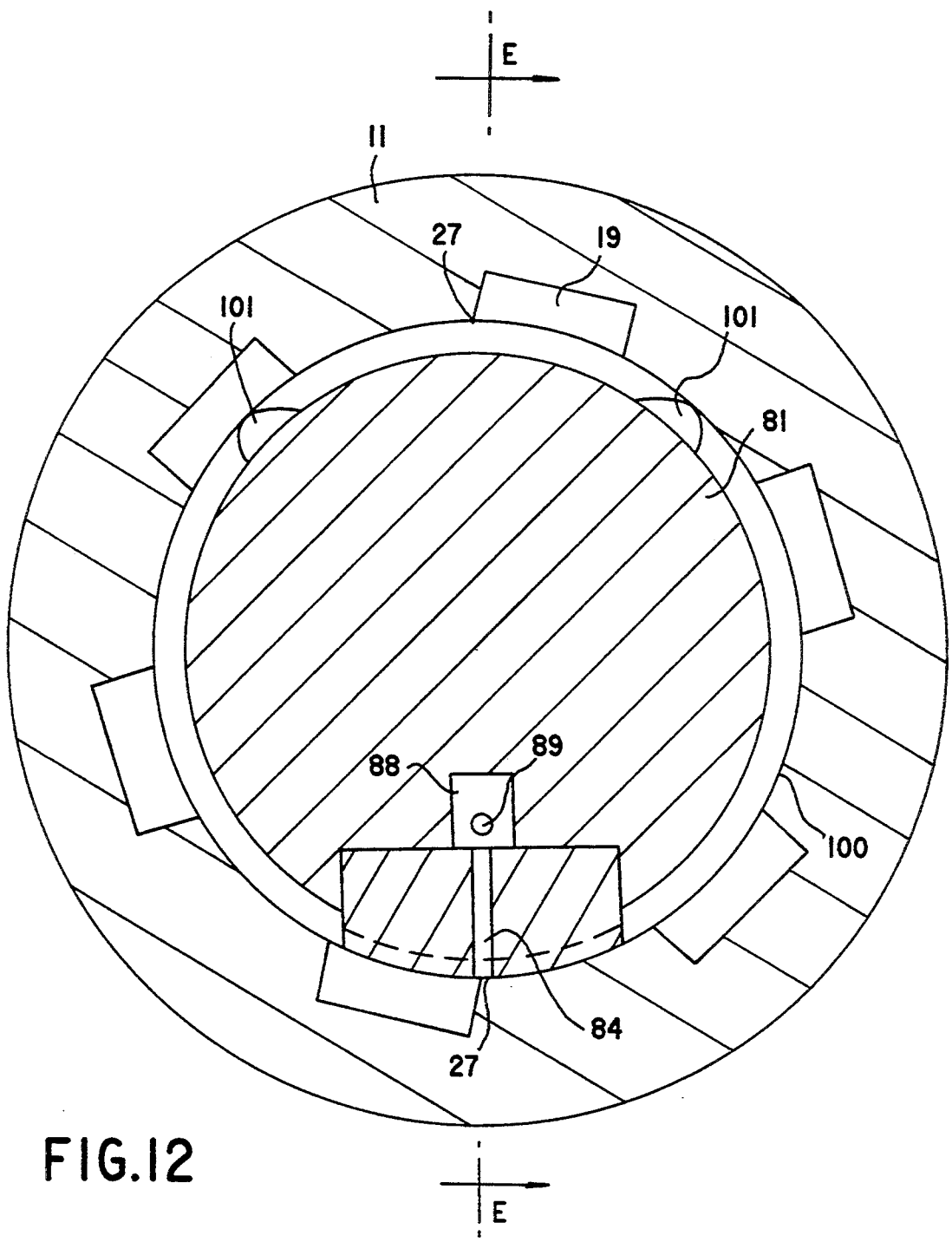
FIG. 12 is a cross-section of another embodiment of the gauging device used to measure the angular position of the sleeve slots where the fluid employed is a gas.
Figure 13:
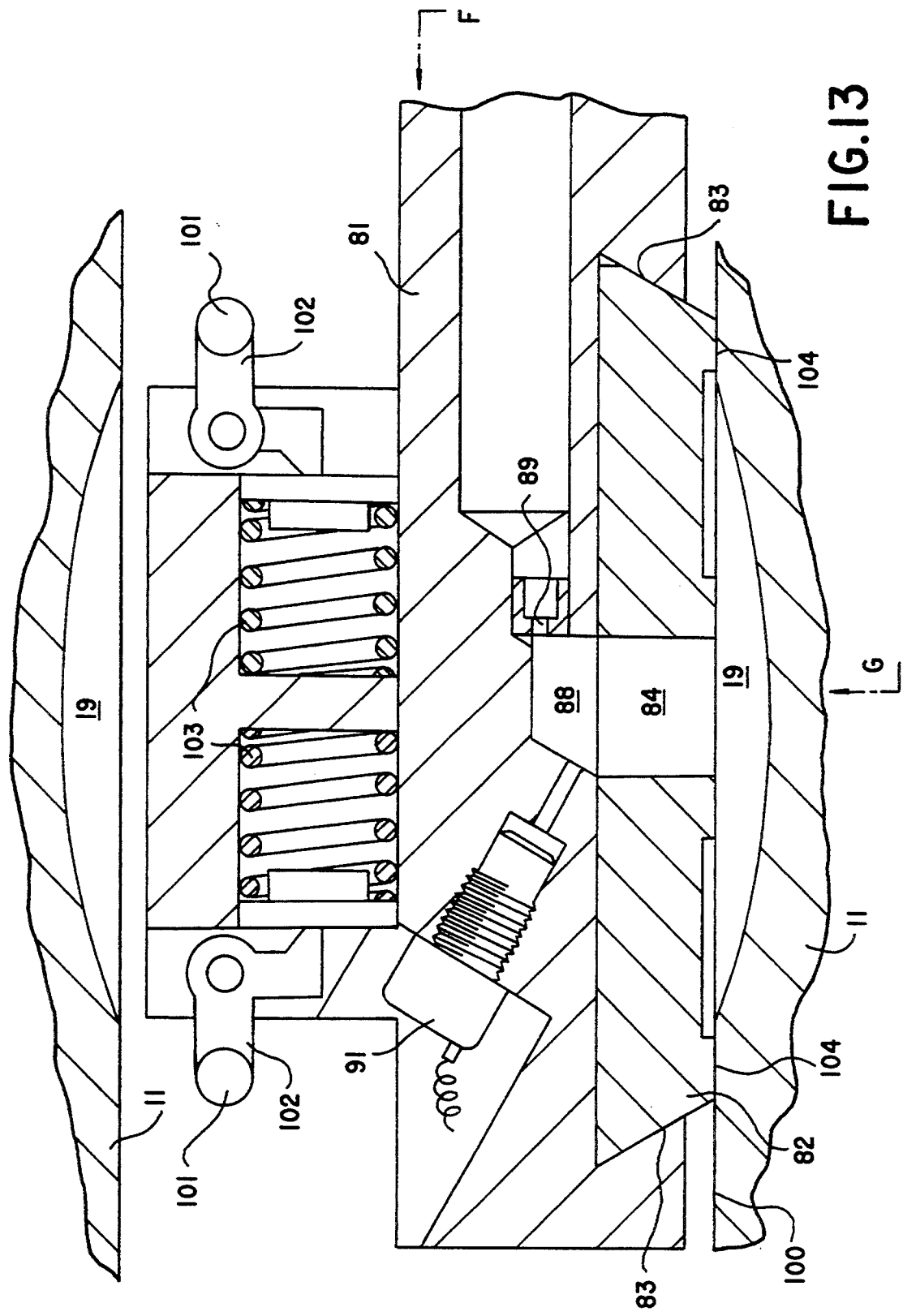
FIG. 13 is a cross-sectional view on plane EE in FIG. 12.
Figure 14:
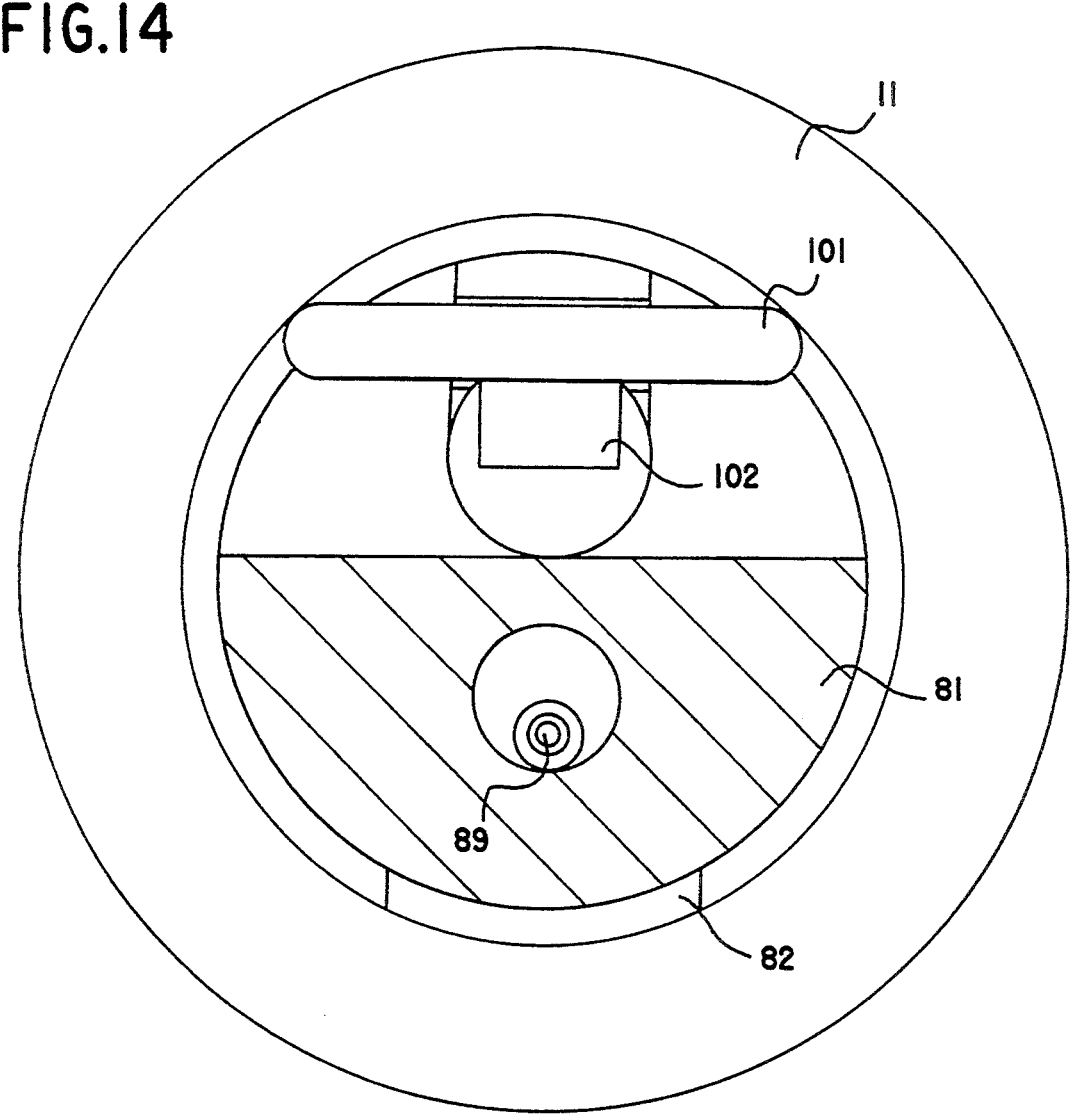
FIG. 14 is a view in direction F in FIG. 13.
Figure 15:
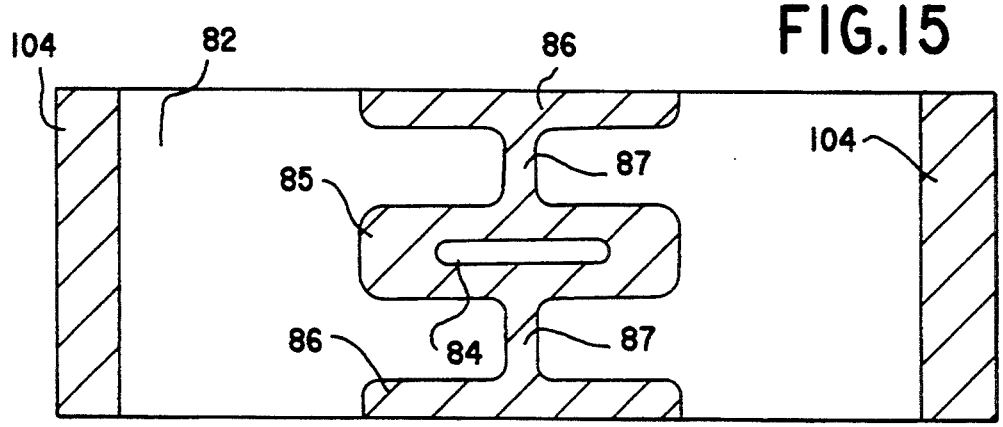
FIG. 15 is a view in direction G in FIG. 13, with the sleeve removed, showing details of the shoe of the gauging device.

Now referring to FIG. 11 in which the degree of restriction occurring between slit 84 and the corresponding inner or outer metering edge contours 31 and 26 (respectively) is measured using a liquid rather than a gaseous fluid. The general configuration of shoe 82 is identical to that shown in FIG. 6 and 7 and slit 84 communicates with a larger plenum chamber 97 in gauging device 81. Fluid at a predetermined, regulated flow rate is supplied to plenum chamber 97 by a flexible pipe 90 and the pressure in plenum chamber 97 is again measured by pressure transducer 91. As it is undesirable to stagnate the fluid flow in flexible pipe 90 when slit 84 is blocked when traversing lands 98 of the input-shaft, a pressure relief valve 99 is provided to bypass flow in this situation so that shoe 82 is not forced away from contact with the input-shaft. Naturally pressure relief valve 99 is adjusted to "blow-off" at a pressure higher than reference pressure 96 used for the calculation of the angular position of the metering edge contours.

In order to improve the response of the gauging system, it may be arranged to rotate motor 68 at variable speed. Hence during times when intimate contact zone 85 is adjacent to the portion of the metering edge contour to be gauged, the angular velocity of input-shaft 10 may be reduced, decreasing the influence of response lags in the hydraulic or pneumatic measuring system.

FIGS. 12, 13, 14 and 15 show an alternative embodiment of gauging device 81, when used to measure the angular disposition of the edges 27 of slots 19 within bore 100 of a sleeve 11. For reasons of clarity, corresponding parts to the above embodiment are labeled the same in describing this alternative embodiment (ie. the gauging device for the input-shaft).

Gauging device 81 is basically cylindrical and is guided in bore 100 by convex arcuate shoe 82 and hemispherically tipped guiding arms 101. Guiding arms 101 are attached to pivoted levers 102 and hence spring loaded against bore 100 by opposed springs 103, housed within the body of gauging device 81. Guiding arms 101 are axially disposed at either end of gauging device 81 and hence contact bore 100 in a region axially displaced from slots 19. Hence, as relative rotation occurs between sleeve 11 and gauging device 81 during measurement, guiding arms 101 contact along a continuous, uninterrupted diametral plane within bore 100. This ensures that gauging device 81 is guided concentrically within bore 100 and that intimate contact zone 85 of shoe 82, incorporating axially aligned slit 84, is held in surface contact with bore 100. Guide zones 86 and small bridge zones 87 serve the same function as in the case of the previously described embodiment. Axial alignment is also aided by additional guide zones 104 which contact bore 100 in the same diametral plane as do guiding arms 101.

It will be appreciated, that in order to maintain conformity between intimate contact zone 85 and bore 100, the radius of convex arcuate shoe 82 should be slightly smaller than the radius of sleeve bore 100. As before all zones 85, 86, 87 and 104 will lie on this same radius.

The pneumatic function of this alternative embodiment of gauging device 81 is identical to that earlier described, indeed a still further embodiment could be employed, analogous to that already described in reference to FIG. 11, where the fluid medium is liquid rather than gaseous for instance, the liquid may be a grinding coolant.

The relative rotational motion between gauging device 81 and sleeve 11 could be achieved by rotating either (or indeed both) these components. Most practically, however, sleeve 11 would be supported externally in a collet and rotated while gauging device 81, once inserted into sleeve bore 100, would be held stationary. Of course, in this case, gauging device 81 would have to be mounted with a small degree of radial (but not rotational) compliance to allow it to conform to sleeve bore 100, which might not necessarily be perfectly concentric with its outside diameter.

It will be apparent to people skilled in the art of power assisted steering gears that numerous possible configurations of the present invention are feasible and most of the benefits outlined will result.

I claim:

1. An apparatus for measuring and recording an angular position of edges of axially extending grooves disposed on an inside cylindrical bore surface or outside cylindrical surface of a workpiece, said apparatus comprising:

a shoe having an arcuate surface;
    a plenum chamber;
    means to press said arcuate surface of said shoe into intimate contact with said workpiece cylindrical surface;
    a slit incorporated within said arcuate surface, said slit extending longitudinally parallel to an axis of said workpiece and away from said arcuate surface towards said plenum chamber and communicating with said plenum chamber;
    means to supply fluid to said plenum chamber;
    means to cause relative rotation between said workpiece and said shoe;
    means to measure the degree of restriction to flow of said fluid from said slit as said edges traverse said slit slit during said relative rotation;
    angular positional measurement means to measure said relative rotation, wherein said relative angular position of said workpiece is recorded at each relative rotational position corresponding to a predetermined degree of restriction of said slit as successive edges traverse said slit.

2. An apparatus as claimed in claim 1 in which said arcuate surface of said shoe is concave and has a radius slightly larger than the radius of said outside cylindrical surface of said workpiece for measuring and recording the angular position of grooves on said outside cylindrical surface.

3. An apparatus as claimed in claim 1 in which said arcuate surface of said shoe is convex and has a radius slightly smaller than the radius of said inside cylindrical bore surface of said workpiece for measuring and recording the angular position of grooves on the inside of said cylindrical bore surface.

4. An apparatus as claimed in claim 1 wherein the means to supply fluid is a means to supply a gas, said gas being supplied from a source, said source being at a substantially constant pressure, and said means to measure said degree of restriction comprises a calibrated orifice interposed between said source and said plenum chamber, and pressure measurement means measuring the pressure in said plenum chamber.

5. An apparatus as claimed in claim 1 wherein the means to supply fluid is a means to supply a liquid, said liquid being supplied from a source at a rate of flow which is substantially constant during the periods when said edges of said axially extending grooves traverse a slit in said arcuate surface, and in which said means to measure said degree of restriction of flow from said slit comprises pressure measurement means located between said source and said slit.

6. An apparatus as claimed in claim 1 further including computational means to analyze recorded angular positions of said edges and calculate a correction angle such as to ensure that the metering edge contours are ground symmetrically on said edges with respect to the mean position of the said edges and means to adjust angularly said drive means in accordance with said edges and means to adjust angularly said drive means in accordance with said calculated correction angle.

7. An apparatus as claimed in claim 6 having means to reduce the rate of rotation of said means to cause relative rotation between said workpiece of said shoe to some pre-determined slow rate whenever said slit traverses said edges of said axially extending grooves.

8. An apparatus as claimed in claim 6 in which said fluid employed for said measurement is the same as, or miscible with, a coolant used for said grinding.

9. An apparatus as claimed in claim 6 in which said shoe incorporates radial position measurement means, for measurement of the outside diameter of said input-shaft, and for computation of a radial distance between each said metering edge contour and the axis of said input-shaft by a computer means, and for computation of the angular relationship between all said metering edge contours ground, irrespective of small diameter variations of successively processed said input-shafts.

* * * * *